United States Patent
Kim et al.

(10) Patent No.: US 9,722,241 B2
(45) Date of Patent: Aug. 1, 2017

(54) POSITIVE ACTIVE MATERIAL FOR RECHARGEABLE LITHIUM BATTERY, METHOD OF PREPARING SAME, AND RECHARGEABLE LITHIUM BATTERY INCLUDING SAME

(71) Applicant: SAMSUNG SDI CO., LTD., Yongin-si, Gyeonggi-do (KR)

(72) Inventors: Ji-Hyun Kim, Yongin-si (KR); Chang-Wook Kim, Yongin-si (KR); Sang-Woo Cho, Yongin-si (KR); Yong-Chan You, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 182 days.

(21) Appl. No.: 14/682,022

(22) Filed: Apr. 8, 2015

(65) Prior Publication Data
US 2015/0364756 A1   Dec. 17, 2015

(30) Foreign Application Priority Data

Jun. 17, 2014 (KR) ........................ 10-2014-0073668

(51) Int. Cl.
| | |
|---|---|
| *H01M 4/36* | (2006.01) |
| *H01M 4/04* | (2006.01) |
| *H01M 4/131* | (2010.01) |
| *H01M 4/1391* | (2010.01) |
| *H01M 4/525* | (2010.01) |
| *H01M 4/505* | (2010.01) |
| *H01M 4/485* | (2010.01) |
| *C01G 53/00* | (2006.01) |
| *C01G 45/12* | (2006.01) |

(52) U.S. Cl.
CPC ........ *H01M 4/366* (2013.01); *C01G 45/1257* (2013.01); *C01G 53/006* (2013.01); *C01G 53/54* (2013.01); *H01M 4/0471* (2013.01); *H01M 4/131* (2013.01); *H01M 4/1391* (2013.01); *H01M 4/485* (2013.01); *H01M 4/505* (2013.01); *H01M 4/525* (2013.01); *C01P 2004/03* (2013.01); *C01P 2004/64* (2013.01); *C01P 2004/88* (2013.01); *C01P 2006/40* (2013.01)

(58) Field of Classification Search
CPC .. H01M 4/0471; H01M 4/131; H01M 4/1391; H01M 4/366; H01M 4/485; H01M 4/505; H01M 4/525; C01G 45/1257; C01G 53/006; C01G 53/54
See application file for complete search history.

(56) References Cited

U.S. PATENT DOCUMENTS

2012/0282513 A1   11/2012   Schaefer et al.

FOREIGN PATENT DOCUMENTS

| KR | 10-2012-0089845 A | 8/2012 |
| KR | 10-2012-0100722 A | 9/2012 |
| KR | 10-2012-0102631 A | 9/2012 |

*Primary Examiner* — Carlos Barcena
(74) *Attorney, Agent, or Firm* — Lewis Roca Rothgerber Christie LLP

(57) ABSTRACT

A positive active material for a rechargeable lithium battery includes a core including an overlithiated oxide represented by Chemical Formula 1, a first coating layer on the core and including a compound having a spinel structure, and a second coating layer on the first coating layer and including a compound represented by Chemical Formula 2. The compound having a spinel structure shows a peak between about 2.6 V and about 2.7 V in a graph of differential capacity dQ/dV vs. voltage, where the voltage is between about 4.7 V and about 2.5 V. In Chemical Formula 1, $0<x<1$, $0<a<1$, $0<b<1$, $0<c<1$, and $a+b+c=1$. In Chemical Formula 2, $0\leq d<1$ and $0<e\leq 1$.

$xLi_2MnO_3\cdot(1-x)LiNi_aCo_bMn_cO_2$,    Chemical Formula 1

$Li_dTi_eO_2$.    Chemical Formula 2

13 Claims, 9 Drawing Sheets

POSITIVE ACTIVE MATERIAL FOR RECHARGEABLE LITHIUM BATTERY, METHOD OF PREPARING SAME, AND RECHARGEABLE LITHIUM BATTERY INCLUDING SAME

CROSS-REFERENCE TO RELATED APPLICATION

This application claims priority to and the benefit of Korean Patent Application No. 10-2014-0073668 filed in the Korean Intellectual Property Office on Jun. 17, 2014, the entire content of which is incorporated herein by reference.

BACKGROUND

1. Field

One or more aspects of embodiments of the present invention are directed to a positive active material for a rechargeable lithium battery, a method of preparing the same, and a rechargeable lithium battery including the same.

2. Description of the Related Art

Rechargeable lithium batteries can be utilized as a power source for small portable electronic devices. Rechargeable lithium batteries typically include an organic electrolyte solution and therefore, may have at least twice the discharge voltage of a conventional battery utilizing an alkaline aqueous solution. Accordingly, rechargeable lithium batteries have high energy density.

A rechargeable lithium battery is typically manufactured by injecting an electrolyte solution into a battery cell, which includes a positive electrode including a positive active material capable of intercalating/deintercalating lithium ions and a negative electrode including a negative active material capable of intercalating/deintercalating lithium ions.

$LiCoO_2$ has been widely utilized as the positive active material, but $LiCoO_2$ has a high manufacturing cost, and the supply of $LiCoO_2$ is unstable due to the scarcity of cobalt (Co). Accordingly, a low-cost positive active material including Ni (nickel) or Mn (manganese) has been researched.

However, while the positive active material including nickel is suitable for a high capacity and high voltage battery, it has unstable structure and weak thermal stability due to its reaction with the electrolyte solution and thus, may deteriorate the capacity of the battery.

On the other hand, an overlithiated oxide, for example, may increase the capacity of the battery, since lithium ions are released from the overlithiated oxide at a high voltage of greater than or equal to about 4.5 V. However, an overlithiated oxide may generate oxygen gas during the reaction and thus, may facilitate an irreversible reaction during which lithium ions get released and do not re-participate in the reaction.

SUMMARY

One or more aspects of embodiments of the present invention are directed to a positive active material for a rechargeable lithium battery having high capacity, good rate capability, and good cycle-life characteristics at a high voltage.

Another embodiment is directed to a method of preparing the positive active material for a rechargeable lithium battery.

Another embodiment is directed to a rechargeable lithium battery including the positive active material.

In one embodiment, a positive active material for a rechargeable lithium battery includes a core including an overlithiated oxide represented by Chemical Formula 1; a first coating layer coated (e.g. surrounding) the core and including a compound having a spinel structure; and a second coating layer coated (e.g. surrounding) the first coating layer and including a compound represented by Chemical Formula 2, wherein the compound having a spinel structure has a peak between about 2.6 V and about 2.7 V in a dQ/dV charge and discharge differential curved line (i.e. in a graph of differential capacity dQ/dV vs. voltage), the voltage of the graph being between about 4.7 V to about 2.5 V.

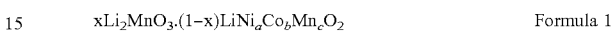

$xLi_2MnO_3 \cdot (1-x)LiNi_aCo_bMn_cO_2$      Formula 1

In Chemical Formula 1, $0<x<1$, $0<a<1$, $0<b<1$, $0<c<1$, and $a+b+c=1$.

$Li_dTi_eO_2$      Formula 2

In Chemical Formula 2, $0 \leq d<1$ and $0<e1$.

The compound having a spinel structure may be a compound represented by Chemical Formula 3.

$Li_fM_gO_h$      Formula 3

In the above Chemical Formula 3, M is Mn, Co, Ni, or a combination thereof, $0<f<1$, $1.9<g<2.1$, and $3.9<h<4.1$.

The second coating layer may include about 0.1 parts by mole to about 5 parts by mole of titanium (Ti) based on 100 parts by mole of the core.

The second coating layer may be about 10 nm to about 50 nm thick.

The first and second coating layers together may be about 15 nm to about 60 nm thick.

The average particle diameter (D50) of the positive active material may be of about 100 nm to about 500 nm.

In another embodiment of the present invention, a method of preparing the positive active material includes co-precipitating a nickel (Ni) source, a cobalt (Co) source and a manganese (Mn) source with ammonium hydroxide ($NH_4OH$) or sodium hydroxide (NaOH) to obtain a precipitate; mixing the precipitate with a lithium source to obtain a first mixture; treating the first mixture with a primary heat treatment to obtain an overlithiated oxide represented by Chemical Formula 1; mixing an alcohol and a titanium (Ti) source to obtain a second mixture; mixing the second mixture and the overlithiated oxide to obtain a third mixture; and treating the third mixture with a secondary heat treatment to obtain the overlithiated oxide coated with a compound having a spinel structure and a compound represented by Chemical Formula 2.

The titanium (Ti) source may be titanium isopropoxide, a $TiO_2$ powder, or a combination thereof.

The titanium (Ti) source may be included in an amount of about 0.1 parts by mole to about 5 parts by mole based on 100 parts by mole of the overlithiated oxide.

The titanium (Ti) source may be the $TiO_2$ powder, and the $TiO_2$ powder may have an average particle diameter of about 10 nm to about 50 nm.

The primary heat treatment may be performed at about 600° C. to about 1000° C.

The secondary heat treatment may be performed at about 300° C. to about 800° C.

In one embodiment, a rechargeable lithium battery includes a positive electrode including the positive active material; a negative electrode including a negative active material; and an electrolyte.

Other embodiments are included in the following detailed description.

In view of the above and according to an embodiment of the present invention, a rechargeable lithium battery having high capacity, good rate capability, and good cycle-life characteristics at a high voltage may be realized.

DETAILED DESCRIPTION

Figure 1:
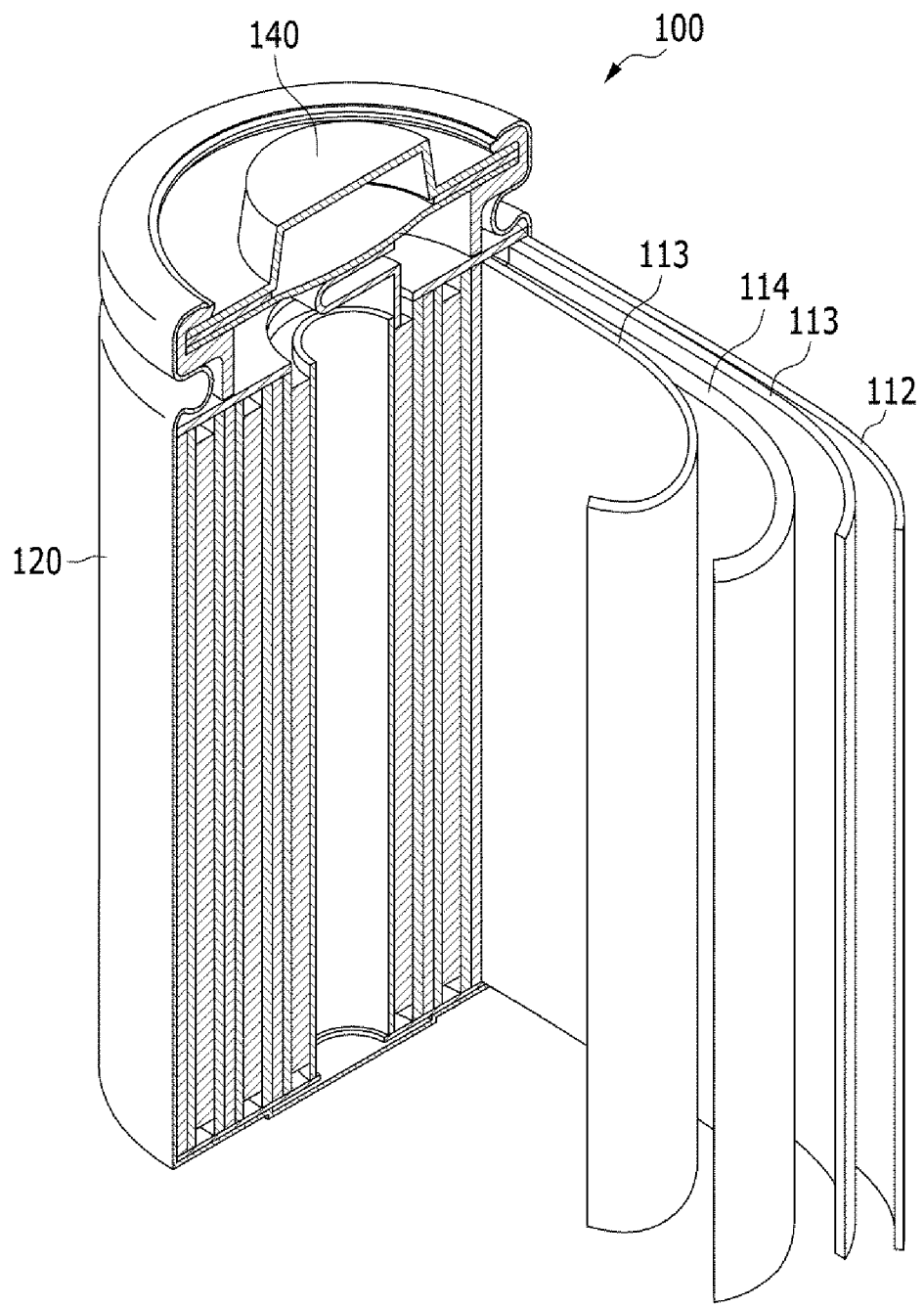
FIG. 1 is a schematic view showing a rechargeable lithium battery according to one embodiment.

Hereinafter, embodiments of the present invention are described in more detail. However, these embodiments are exemplary, and this disclosure is not limited thereto.

Unless otherwise defined in the specification, an average particle diameter (D50) refers to the average diameter of a particle corresponding to 50% by volume of a total cumulative volume in a particle distribution. Expressions such as "at least one of" and "one of," when preceding a list of elements, modify the entire list of elements and do not modify the individual elements of the list. Further, the use of "may" when describing embodiments of the present invention refers to "one or more embodiments of the present invention."

According to one embodiment, a positive active material for a rechargeable lithium battery may include a core, a first coating layer on (e.g. surrounding) the core, and a second coating layer on (e.g. surrounding) the first coating layer.

The core may include an overlithiated oxide represented by Chemical Formula 1, the first coating layer may include a compound having a spinel structure, and the second coating layer may include a compound represented by Chemical Formula 2.

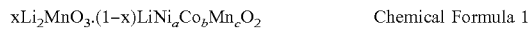

$$xLi_2MnO_3 \cdot (1-x)LiNi_aCo_bMn_cO_2 \qquad \text{Chemical Formula 1}$$

In Chemical Formula 1, $0<x<1$, $0<a<1$, $0<b<1$, $0<c<1$, and $a+b+c=1$.

$$Li_dTi_eO_2 \qquad \text{Chemical Formula 2}$$

In Chemical Formula 2, $0 \leq d<1$ and $0<e \leq 1$.

The overlithiated oxide is a material having high capacity. However, since $Li_2MnO_3$ (the main component of the overlithiated oxide of Chemical Formula 1) has low ion conductivity and electrical conductivity, the overlithiated oxide has an increased internal resistance due to the decomposition of an electrolyte and a side reaction of the electrolyte with the positive active material at a high voltage of greater than or equal to about 4.5 V. Accordingly, there is a limit as to how much the overlithiated oxide of Chemical Formula 1 may deteriorate the rate capability and cycle-life characteristics.

In one embodiment of the present invention, the surface of the overlithiated oxide may be modified to improve rate capability and cycle-life characteristics. Specifically, the surface of the overlithiated oxide may be coated with a compound including titanium (Ti) and represented by Chemical Formula 2, while a compound having a spinel structure may be formed during the coating of the compound represented by Chemical Formula 2 as a separate layer between the overlithiated oxide and the compound represented by Chemical Formula 2. The resulting positive active material including the overlithiated oxide coated with the compound represented by Chemical Formula 2 and the compound having a spinel structure may realize a rechargeable lithium battery having good rate capability and cycle-life characteristics, as well as high capacity.

The compound having a spinel structure (in the first coating layer) may be a compound represented by Chemical Formula 3.

$$Li_fM_gO_h \qquad \text{Chemical Formula 3}$$

In Chemical Formula 3, M is Mn, Co, Ni, or a combination thereof, $0<f<1$, $1.9<g<2.1$, and $3.9<h<4.1$.

The compound having a spinel structure may improve ion conductivity and consequently, rate capability.

The compound having a spinel structure may be coated on the surface of the overlithiated oxide during the coating of the compound represented by Chemical Formula 2, in a process of preparing the positive active material. The compound having a spinel structure may include a smaller amount of Li than that included in $Li_2MnO_3$ (the main component of the overlithiated oxide).

The compound having a spinel structure may be formed during the coating of the compound represented by Chemical Formula 2 on the surface of overlithiated oxide, in a process of preparing the positive active material, and the formation of the compound having a spinel structure may be confirmed by a charge and discharge curved line (i.e. by analyzing a graph of differential capacity dQ/dV vs. voltage) of the rechargeable lithium battery including the positive active material. Specifically, the presence of the compound having a spinel structure may be confirmed by a peak between about 2.6 V and about 2.7 V in a dQ/dV vs. voltage graph, when the voltage of the graph is between about 4.7 V to about 2.5 V.

In one embodiment, the compound represented by Chemical Formula 2 (in the second coating layer) may prevent (or reduce) direct contact of the positive active material with the electrolyte at a high voltage and may suppress (or reduce) a side reaction between the positive active material and the electrolyte, thus improving cycle-life characteristics of the battery.

The compound represented by Chemical Formula 2 may include titanium (Ti) in an amount of about 0.1 parts by mole to about 5 parts by mole, and in some embodiments about 0.5 parts by mole to about 4 parts by mole, or about 1 part by mole to about 3 parts by mole, based on 100 parts by mole of the core including the overlithiated oxide. When Ti is included within any of these ranges, rate capability and cycle-life characteristics may be improved.

The second coating layer including the compound represented by Chemical Formula 2 may be about 10 nm to about 50 nm thick and in some embodiments, about 20 nm to about 40 nm thick. When the thickness of the second coating layer is within any of these ranges, cycle-life characteristics may be improved.

The first coating layer may be about 5 nm to 10 nm.

In one embodiment, the first and second coating layers together may be about 15 nm to about 60 nm thick and in some embodiments, about 20 nm to about 50 nm thick. When the total thickness of the first and second coating layers is within any of these ranges, rate capability and cycle-life characteristics may be improved, without a substantial capacity deterioration.

The average particle diameter of the positive active material (D50) may be about 100 nm to about 500 nm and in some embodiments, about 300 nm to about 500 nm. When the positive active material has the average particle diameter within any of these ranges, good capacity and rate capability may be realized.

The positive active material may be prepared by a method which includes co-precipitating a nickel (Ni) source, a cobalt (Co) source and a manganese (Mn) source with ammonium hydroxide ($NH_4OH$) or sodium hydroxide (NaOH) to obtain a precipitate; mixing the precipitate with a lithium source to obtain a first mixture; treating the first mixture with a primary heat treatment to obtaining an overlithiated oxide represented by Chemical Formula 1; mixing an alcohol and a titanium (Ti) source to obtain a second mixture; mixing the second mixture and the overlithiated oxide to obtain a third mixture; treating the third mixture with a secondary heat treatment to obtain the overlithiated oxide coated with a compound having a spinel structure and a compound represented by Chemical Formula 2.

In one embodiment, the nickel (Ni) source, the cobalt (Co) source and the manganese (Mn) source are, without limitation, an acetate, a nitrate, a hydroxide, an oxide, a sulfate or the like of Ni, Co and Mn, respectively. In one embodiment, the nickel (Ni) source, the cobalt (Co) source and the manganese (Mn) source may each be a sulfate of Ni, Co and Mn, respectively. The nickel source, the cobalt source and the manganese (Mn) source may be used in the form of solids or liquids. When the sources may be used in the form of liquids, solvent may be water, but is not limited thereto.

The co-precipitation reaction may be performed at pH 10 to 12 for about 8 hours to about 10 hours at about 35° C. to about 40° C. and at a speed of about 600 rpm to about 800 rpm.

The lithium source may be lithium carbonate, lithium acetate, lithium hydroxide or the like.

The primary heat treatment may be performed at about 600° C. to about 1000° C., and in some embodiments, about 800° C. to about 1000° C., or about 900° C. to about 1000° C. In another embodiment, the primary heat treatment may be performed by increasing a temperature at a rate of 1° C./min to 3° C./min until the temperature is reached to the above temperature. When the primary heat treatment is performed within any of these temperature ranges, the overlithiated oxide may be capable of maximizing (or increasing) capacity as well as maintaining crystallinity.

The alcohol may include anhydrous ethanol, isopropyl alcohol, methanol, butanol and/or the like.

The titanium (Ti) source may be titanium isopropoxide, a $TiO_2$ powder, or a combination thereof. When the titanium source is titanium isopropoxide, deionized water may be further added, after titanium isopropoxide is mixed with the alcohol, and $Ti(OH)_4$ may be produced.

In one embodiment, the $TiO_2$ powder may be the titanium (Ti) source. The $TiO_2$ powder may have an average particle diameter of about 10 nm to about 50 nm and in some embodiments, about 15 nm to about 50 nm. When the $TiO_2$ powder has an average particle diameter within any of these ranges, it may be easier to form the compound having a spinel structure between the surface of the overlithiated oxide and the compound represented by Chemical Formula 2 and coated on the overlithiated oxide and thus, rate capability and cycle-life characteristics may be improved.

The titanium (Ti) source may be included in an amount of about 0.1 parts by mole to about 5 parts by mole, and in some embodiments about 0.5 parts by mole to about 4 parts by mole, or about 1 part by mole to about 3 parts by mole, based on 100 parts by mole of the overlithiated oxide. When the titanium source is included within any of these ranges, it may be easier to form the compound having a spinel structure between the surface of the overlithiated oxide and the compound represented by Chemical Formula 2 and coated on the overlithiated oxide and thus, rate capability and cycle-life characteristics may be improved.

The secondary heat treatment may be performed at about 300° C. to about 800° C., and in some embodiments about 500° C. to about 800° C., or about 600° C. to about 700° C. When the secondary heat treatment is performed within any of these ranges, it may be easier to form the compound having a spinel structure between the surface of the overlithiated oxide and the compound represented by Chemical Formula 2 and coated on the overlithiated oxide and thus, rate capability and cycle-life characteristics may be improved.

Hereinafter, a rechargeable lithium battery including the positive active material is illustrated referring to FIG. 1.

FIG. 1 is a schematic view showing a rechargeable lithium battery according to one embodiment.

Referring to FIG. 1, a rechargeable lithium battery 100 includes an electrode assembly including a positive electrode 114, a negative electrode 112 facing the positive electrode 114, a separator 113 between the negative electrode 112 and the positive electrode 114, an electrolyte solution impregnating the electrode assembly, a battery case 120 including the electrode assembly, and a sealing member 140 sealing the battery case 120.

The positive electrode 114 includes a current collector and a positive active material layer on the current collector. The positive active material layer includes a positive active material, a binder, and, optionally, a conductive material.

The current collector may be Al, but is not limited thereto.

The positive active material may be as described above.

The binder improves the binding properties of the positive active material particles with one another and with the current collector, and examples of the binder may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves the conductivity of the electrode. Any suitable electrically conductive material may be utilized as the conductive material, so long as it does not cause a chemical change in the battery, and non-limiting examples of the conductive material may include one or more of natural graphite, artificial graphite, carbon black, acetylene black, ketjen black, a carbon fiber, a metal powder, or a metal fiber of copper, nickel, aluminum, silver, or the like, and a conductive polymer such as a polyphenylene derivative or the like.

The negative electrode 112 includes a current collector and a negative active material layer on the current collector.

The negative current collector may be a copper foil, but is not limited thereto.

The negative active material layer may include a negative active material, a binder, and, optionally, a conductive material.

The negative active material may include a material that reversibly intercalates/deintercalates lithium ions, a lithium metal, a lithium metal alloy, a material being capable of doping and dedoping lithium, or a transition metal oxide.

The material that reversibly intercalates/deintercalates lithium ions may be a carbon material and may be any suitable carbon-based negative active material for a lithium ion rechargeable battery. Non-limiting examples of the material that reversibly intercalates/deintercalates lithium ions may include crystalline carbon, amorphous carbon, or a mixture thereof. The crystalline carbon may be non-shaped, sheet-shaped, flake-shaped, spherically-shaped, or fiber-shaped natural graphite or artificial graphite. The amorphous carbon may be a soft carbon, a hard carbon, a mesophase pitch carbonized product, fired coke, or the like.

Non-limiting examples of the lithium metal alloy include an alloy of lithium and a metal selected from Na, K, Rb, Cs, Fr, Be, Mg, Ca, Sr, Si, Sb, Pb, In, Zn, Ba, Ra, Ge, Al, and Sn.

The material being capable of doping and dedoping lithium may be Si, $SiO_x$ (0<x<2), a Si—C composite, a Si-Q alloy (where Q is an alkali metal, an alkaline-earth metal, a Group 13 to 16 element, a transition metal, a rare earth element, or a combination thereof, and Q is not Si), Sn, $SnO_2$, a Sn—C composite, Sn—R (where R is an alkali metal, an alkaline-earth metal, a Group 13 to 16 element, a transition metal, a rare earth element, or a combination thereof, and R is not Sn), or the like, and at least one of these may be mixed with $SiO_2$. Non-limiting examples of Q and R may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide may be vanadium oxide, lithium vanadium oxide, or the like.

The binder improves the binding properties of the negative active material particles with one another and with the current collector, and examples of the binder may include polyvinyl alcohol, carboxymethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves the conductivity of the electrode. Any suitable electrically conductive material may be utilized as the conductive material, so long as it does not cause a chemical change in the battery, and non-limiting examples of the conductive material may include a carbon-based material such as natural graphite, artificial graphite, carbon black, acetylene black, ketjen black, carbon fiber or the like; metal-based material (such as a metal powder, a metal fiber or the like) of copper, nickel, aluminum, silver, or the like; a conductive polymer such as a polyphenylene derivative or the like; and a mixture thereof.

The negative and positive electrodes 112 and 114 may be manufactured by a method that includes mixing the active material, the conductive material, and the binder to prepare an active material composition, and coating the active material composition on the current collector.

The electrode manufacturing method should be apparent to those of ordinary skill in the art, and thus is not described in more detail in the present specification. In one embodiment, the solvent includes N-methylpyrrolidone and the like, but the solvent is not limited thereto.

In one embodiment, the electrolyte solution includes a non-aqueous organic solvent and a lithium salt.

The non-aqueous organic solvent serves as a medium for transmitting the ions taking part in the electrochemical reaction of the battery. The non-aqueous organic solvent may be selected from a carbonate-based solvent, an ester-based solvent, an ether-based solvent, a ketone-based solvent, an alcohol-based solvent, and an aprotic solvent.

The carbonate-based solvent may include, for example, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and/or the like.

In one embodiment, a linear carbonate and a cyclic carbonate are mixed to realize an organic solvent having a high dielectric constant and a low viscosity. The cyclic carbonate and the linear carbonate may be mixed together in a volume ratio of about 1:1 to 1:9.

The ester-based solvent may be, for example, methylacetate, ethylacetate, n-propylacetate, dimethylacetate, methylpropionate, ethylpropionate, γ-butyrolactone, decanolide, valerolactone, mevalonolactone, caprolactone, or the like. The ether solvent may be, for example, dibutylether, tetraglyme, diglyme, dimethoxyethane, 2-methyltetrahydrofuran, tetrahydrofuran, or the like. The ketone-based solvent may be, for example, cyclohexanone, or the like, and the alcohol based solvent may be, for example, ethanol, isopropyl alcohol, or the like.

The non-aqueous organic solvent may be included alone or in a mixture, and when the non-aqueous organic solvent is in a mixture, the mixture ratio may be controlled in accordance with the desirable battery performance.

The electrolyte solution may further include an overcharge inhibitor additive such as ethylene carbonate, pyrocarbonate, or the like.

In one embodiment, the lithium salt is dissolved in the organic solvent, supplies lithium ions in the rechargeable lithium battery, improves lithium ion transportation between the positive and negative electrodes, and facilitates the basic operation of the rechargeable lithium battery.

Non-limiting examples of the lithium salt may include LiPF$_6$, LiBF$_4$, LiSbF$_6$, LiAsF$_6$, LiN(SO$_3$C$_2$F$_5$)$_2$, LiC$_4$F$_9$SO$_3$, LiClO$_4$, LiAlO$_2$, LiAlCl$_4$, LiN(C$_x$F$_{2x+1}$SO$_2$)(C$_y$F$_{2y+1}$SO$_2$), where x and y are natural numbers (e.g. an integer of 1 to 20), LiCl, LiI, LiB(C$_2$O$_4$)$_2$ (lithium bis (oxalato)borate, LiBOB), and a combination thereof.

The lithium salt may be included in a concentration of about 0.1 M to about 2.0 M. When the lithium salt is included within the above concentration range, the electrolyte solution may have good performance and lithium ion mobility due to good (or desired) electrolyte conductivity and viscosity.

The separator 113 may include any material suitable for use in a conventional lithium battery, as long as the material is capable of separating the negative electrode 112 from the positive electrode 114 and providing a transporting passage for lithium ions. In other words, the separator 113 may have a low resistance to ion transportation and a good impregnation characteristics for an electrolyte solution. For example, the material included in the separator may be selected from glass fiber, polyester, TEFLON (tetrafluoroethylene), polyethylene, polypropylene, polytetrafluoroethylene (PTFE), and a combination thereof. The separator may have a form of a non-woven fabric or a woven fabric. In one embodiment, a polyolefin-based polymer separator such as polyethylene, polypropylene or the like is included in the lithium ion battery. In one embodiment, a coated separator including a ceramic component or a polymer material may improve the heat resistance and/or mechanical strength of the battery. The coated separator may have a mono-layered or a multi-layered structure.

Hereinafter, embodiments of the present invention are illustrated in more detail with reference to examples. However, these examples are provided for illustrative purposes only and are not intended to limit the scope of the present disclosure.

Furthermore, what is not described in this disclosure should be apparent to those of ordinary skill in the art.
Preparation of Positive Active Material

EXAMPLE 1

Aqueous solutions of each of NiSO$_4$, CoSO$_4$, and MnSO$_4$, respectively having a concentration of about 2.4 M, were mixed in a mole ratio of 16.7:16.7:66.7, and a NaOH aqueous solution having a concentration of about 7.5 M and a NH$_4$OH aqueous solution having a concentration of about 15 M were added thereto and continuously mixed therewith in a co-precipitator. The obtained mixture was co-precipitated at pH 11 for 8 hours at 40° C. and at a speed of about 700 rpm, thus obtaining a (Ni$_{0.16}$Co$_{0.16}$Mn$_{0.67}$)OH$_2$ precursor.

The precursor was washed, dried in a 120° C. oven and filtered and then, the precursor was mixed with Li$_2$CO$_3$ in a weight ratio of about 1:1.5 using (utilizing) a mixer. The resulting mixture was put in a firing container and fired at 890° C. for 10 hours by increasing a temperature at a speed of 2° C./min until the temperature was reached to 890° C., thus preparing an overlithiated oxide of 0.5Li$_2$MnO$_3$.0.5LiNi$_{0.33}$Co$_{0.33}$Mn$_{0.33}$O$_2$.

Anhydrous ethanol was mixed with one (1) part by mole of titanium isopropoxide (based on 100 parts by mole of the overlithiated oxide), and deionized water was added thereto to produce Ti(OH)$_4$. The overlithiated oxide was put in a beaker in which Ti(OH)$_4$ was dispersed, and the resulting mixture was mixed and slowly dried at 90° C. The dried product was heat-treated at 500° C. for 5 hours under an air atmosphere, thus preparing a positive active material including a surface-modified overlithiated oxide, and including the overlithiated oxide as a core, a first coating layer and a second coating layer. The first coating layer included a compound having a spinel structure represented by LiNi$_a$Co$_b$Mn$_c$O$_4$ (a+b+c=2) and the second coating layer included a compound represented by Li$_{0.67}$Ti$_{0.83}$O$_2$.

EXAMPLE 2

A positive active material was prepared as in Example 1 except for mixing anhydrous ethanol and 1 part by mole of a TiO$_2$ powder having an average particle diameter of 30 nm (based on 100 parts by mole of the overlithiated oxide) and dispersing the mixture for 10 hours, and then placing the overlithiated oxide in a beaker where the TiO$_2$ powder was dispersed.

EXAMPLE 3

A positive active material was prepared as in Example 1 except for including 1.5 parts by mole of titanium isopropoxide (based on 100 parts by mole of the overlithiated oxide).

EXAMPLE 4

A positive active material was prepared as in Example 1 except for mixing anhydrous ethanol and 1.5 parts by mole of a TiO$_2$ powder having an average particle diameter of 30 nm (based on 100 parts by mole of the overlithiated oxide) and dispersing the mixture for 10 hours, and then placing the overlithiated oxide in a beaker where the TiO$_2$ powder was dispersed.

EXAMPLE 5

A positive active material was prepared as in Example 1 except for including 3 parts by mole of titanium isopropoxide (100 parts by mole of the overlithiated oxide).

EXAMPLE 6

A positive active material was prepared as in Example 1 except for mixing ethanol and 3 parts by mole of a TiO$_2$ powder having an average particle diameter of 30 nm (based on 100 parts by mole of the overlithiated oxide) and dispersing the mixture for 10 hours, and then placing the overlithiated oxide in a beaker where the TiO$_2$ powder was dispersed.

EXAMPLE 7

A positive active material was prepared as in Example 1 except for including 4.5 parts by mole of titanium isopropoxide (based on 100 parts by mole of the overlithiated oxide).

EXAMPLE 8

A positive active material was prepared as in Example 1 except for mixing ethanol and 4.5 parts by mole of a TiO$_2$ powder having an average particle diameter of 30 nm (based on 100 parts by mole of the overlithiated oxide) and dispersing the mixture for 10 hours, and then placing the overlithiated oxide in a beaker where the TiO$_2$ powder was dispersed.

COMPARATIVE EXAMPLE 1

Aqueous solutions of each of $NiSO_4$, $CoSO_4$ and $MnSO_4$, respectively having a concentration of about 2.4 M, were mixed in a mole ratio of 4:3:3, and a NaOH aqueous solution having a concentration of about 7.5 M and a $NH_4OH$ aqueous solution having a concentration of about 15 M were added thereto, and continuously mixed in a co-precipitator. The resulting mixture was co-precipitated at pH 11 for 8 hours at 40° C. and at a speed of about 700 rpm, thus obtaining a $(Ni_{0.4}Co_{0.3}Mn_{0.3})OH_2$ precursor.

The precursor was washed, dried in a 120° C. oven and filtered and then, the precursor was mixed with $Li_2CO_3$ in a weight ratio of about 1:1.3 using (utilizing) a hand mixer. The obtained mixture was put in a firing container and fired at 890° C. at a speed of 2° C./min for about 10 hours, thus obtaining an overlithiated oxide of $0.3Li_2MnO_3 \cdot 0.7LiNi_{0.58}Co_{o.418}Mn_{o.002}O_2$.

Evaluation 1: Scanning Electron Microscope (SEM) Analysis of Positive Active Material FIG. 2 is a scanning electron microscope (SEM) photograph showing the positive active material according to Example 7, FIG. 3 is a scanning electron microscope (SEM) photograph showing the positive active material according to Example 5, and FIG. 4 is a scanning electron microscope (SEM) photograph showing the positive active material according to Example 3.

Figure 2:
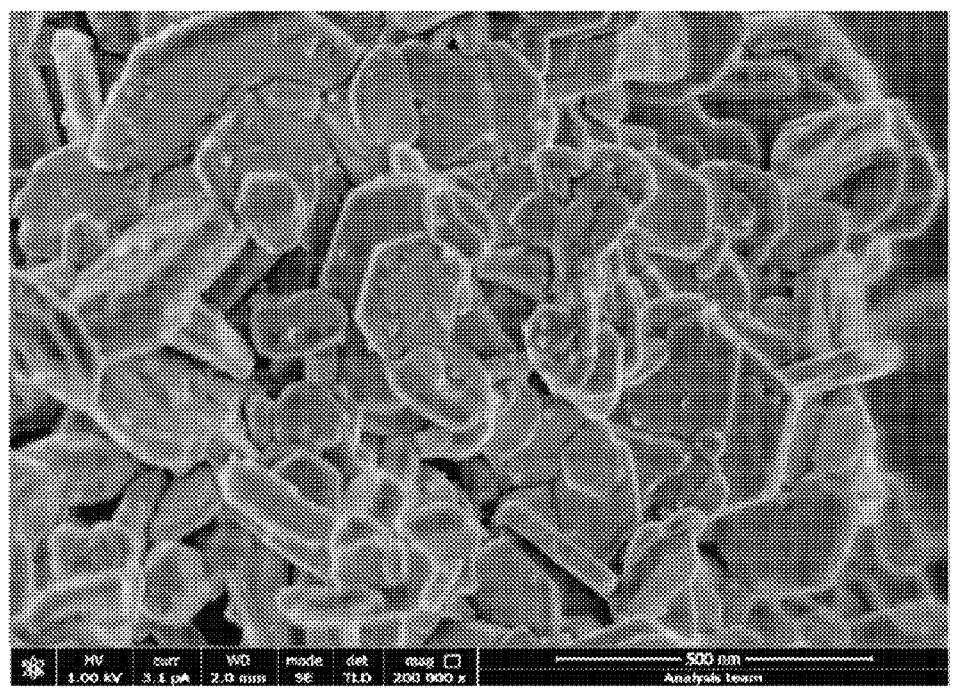
FIG. 2 is a scanning electron microscope (SEM) photograph showing the positive active material according to Example 7.
Figure 3:
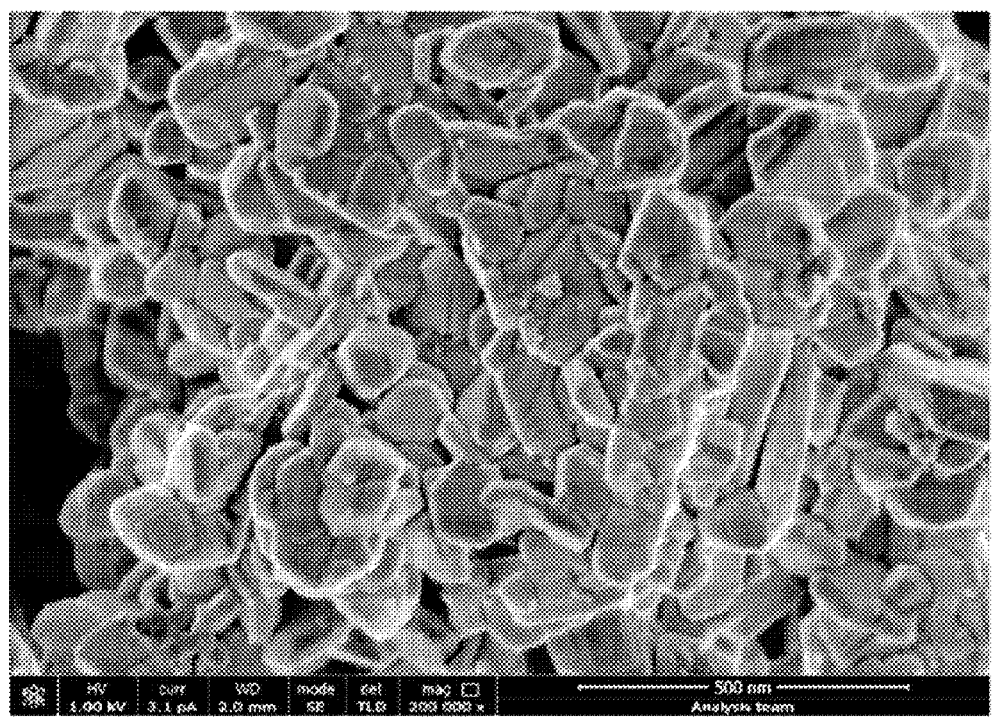
FIG. 3 is a scanning electron microscope (SEM) photograph showing the positive active material according to Example 5.
Figure 4:
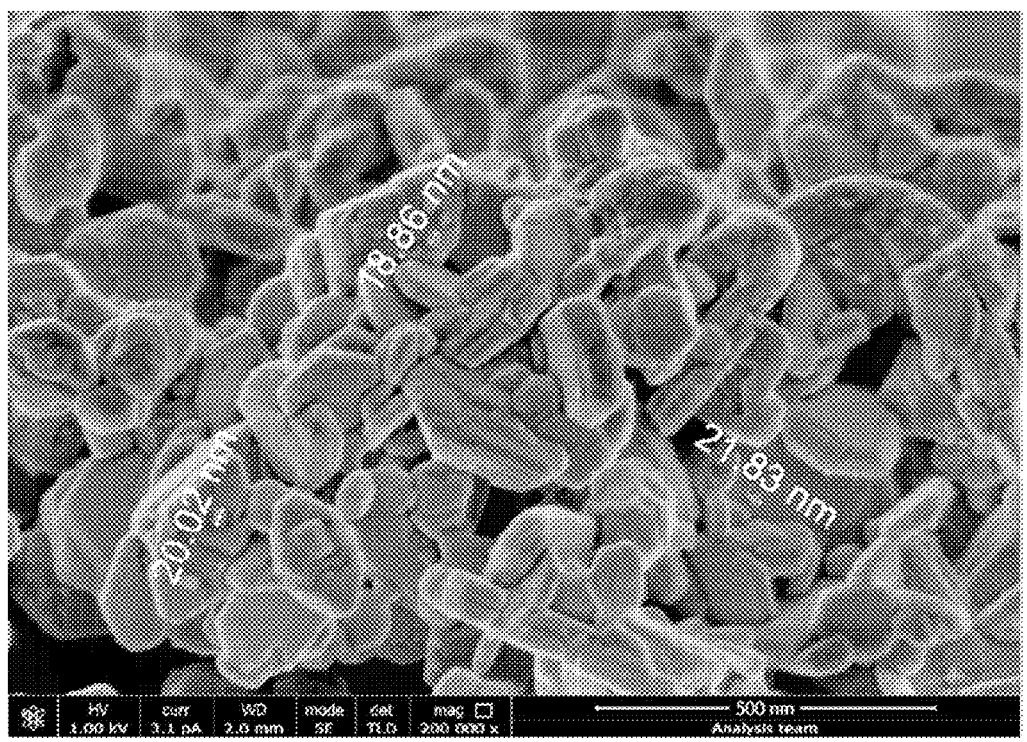
FIG. 4 is a scanning electron microscope (SEM) photograph showing the positive active material according to Example 3.

Referring to FIGS. 2 to 4, the positive active materials according to embodiments of the present invention each had a structure in which the compound represented by Chemical Formula 2 was coated as a layer on the surface of the overlithiated oxide.

For each of Examples 1 to 8 and Comparative Example 1, the size of the positive active material, the total thickness of the coating layer on the surface of the overlithiated oxide, and the thickness of the layer including the compound represented by Chemical Formula 2 were measured and evaluated by the SEM analysis, and the results are provided in Table 1.

TABLE 1

| | Average particle diameter of positive active material (D50, nm) | Total thickness of coating layer (nm) | Thickness of the layer including the compound represented by Chemical Formula 2 (nm) |
|---|---|---|---|
| Example 1 | 298 | 18.2 | 10 |
| Example 2 | 285 | 20.3 | 10 |
| Example 3 | 290 | 19.6 | 12 |
| Example 4 | 303 | 20.9 | 11 |
| Example 5 | 293 | 22.1 | 13 |
| Example 6 | 289 | 21.6 | 12 |
| Example 7 | 304 | 25.4 | 19 |
| Example 8 | 295 | 22.8 | 15 |
| Comparative Example 1 | 302 | — | — |

Manufacture of Rechargeable Lithium Battery Cell 96 wt % of each positive active material according to Examples 1 to 8 and Comparative Example 1, 2 wt % of polyvinylidene fluoride (PVDF) and 2 wt % of acetylene black were mixed and dispersed into N-methyl-2-pyrrolidone, thus preparing a slurry. The slurry was coated on a 60 μm-thick aluminum foil, dried at 135° C. for 1 hour and then compressed, thus manufacturing a positive electrode.

A coin-type half-cell including the positive electrode, and metal lithium as its counter electrode, was manufactured. An electrolyte solution was prepared by mixing ethylene carbonate (EC) and dimethyl carbonate (DMC) in a volume ratio of 3:7, and dissolving $LiPF_6$ in a concentration of 1.3M in the resulting mixed solution.

Evaluation 2: Graph of Differential Capacity vs. Voltage of Rechargeable Lithium Battery Cell The rechargeable lithium battery cells according to Examples 3 and 5 and Comparative Example 1 were charged and discharged at 4.7 V to 2.5 V under a 1 C/1 C CC (constant current) mode at room temperature for 40 cycles, their battery characteristics were evaluated, and the results are provided in FIGS. 5A and 5B.

Figure 5A:
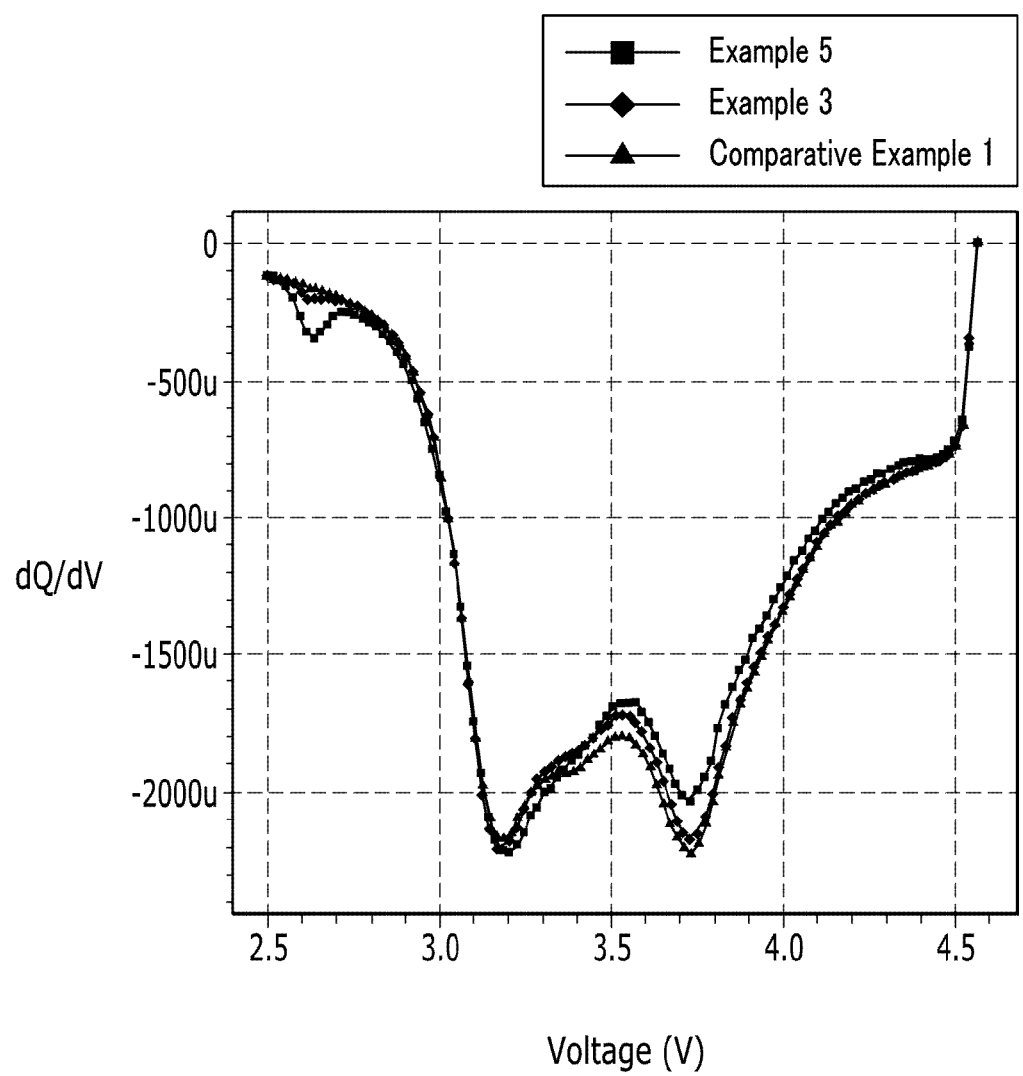
FIG. 5A shows dQ/dV charge and discharge differential curved lines (i.e. a graph of differential capacity dQ/dV vs. voltage) of rechargeable lithium battery cells according to Examples 3 and 5 and Comparative Example 1, when the cells were charged and discharged 3 times.
Figure 5B:
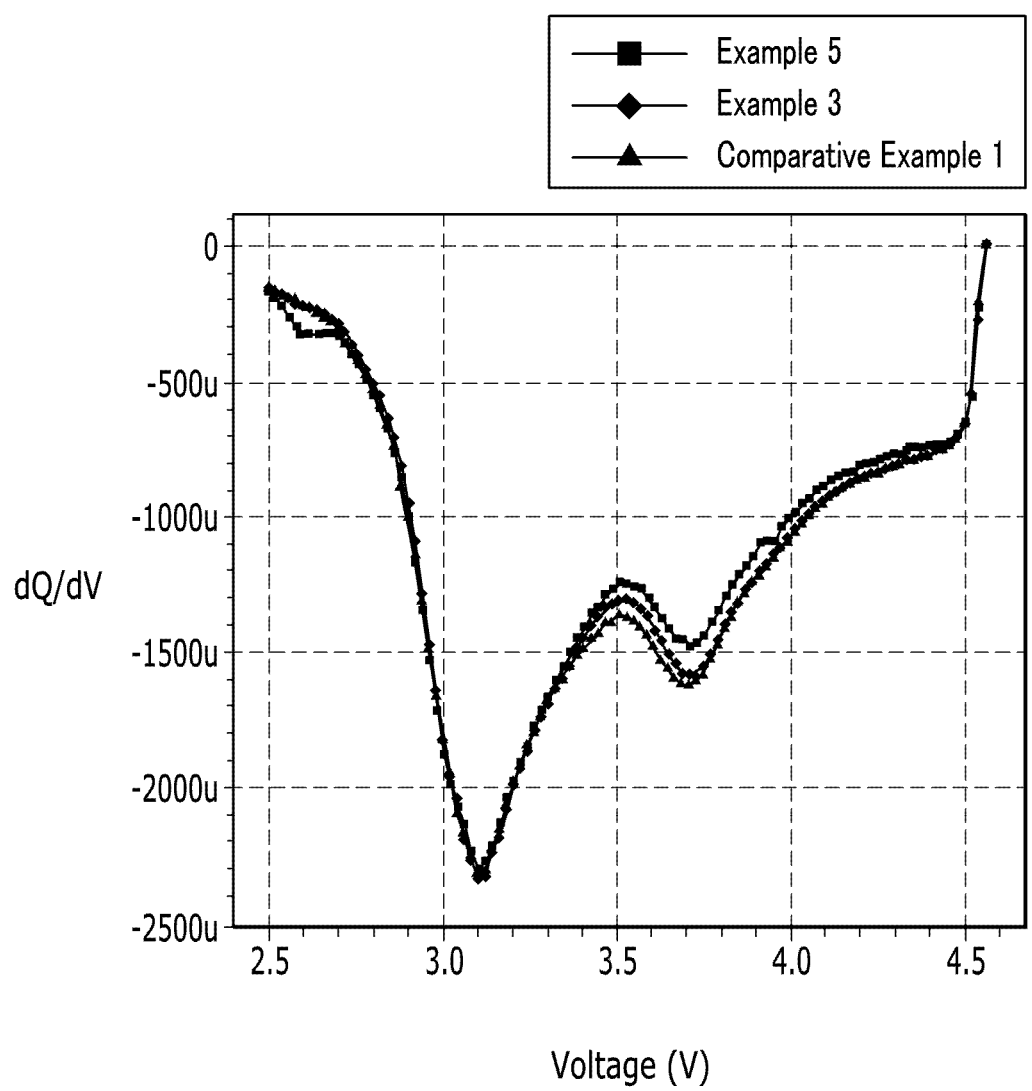
FIG. 5B shows dQ/dV charge and discharge differential curved lines (i.e. a graph of differential capacity dQ/dV vs. voltage) of the rechargeable lithium battery cells according to Examples 3 and 5 and Comparative Example 1, when the cells were charged and discharged 40 times.

FIG. 5A shows dQ/dV charge and discharge differential curved lines (i.e. a graph of differential capacity dQ/dV vs. voltage) of the rechargeable lithium battery cells according to Examples 3 and 5 and Comparative Example 1, when each battery was charged and discharged 3 times, and FIG. 5B is a graph of differential capacity dQ/dV vs. voltage of the rechargeable lithium battery cells according to Examples 3 and 5 and Comparative Example 1, when each battery was charged and discharged 40 times.

Referring to FIGS. 5A and 5B, the rechargeable lithium battery cells according to Examples 3 and 5 each showed a peak (i.e. a downward peak or dip) between 2.6 V and 2.7 V in the graph of differential capacity dQ/dV vs. voltage, which shows that a compound having a spinel structure was formed as a separate layer between a core including the overlithiated oxide and a second coating layer including the compound represented by Chemical Formula 2. In contrast, the rechargeable lithium battery cell according to Comparative Example 1 showed substantially no peak between 2.6 V and 2.7 V, which shows that a layer including a compound having a spinel structure was not formed on the surface of the overlithiated oxide. Although a peak between 2.6 V and 2.7 V is smaller in Example 3 than it is in Example 5, it still can be clearly found on the graph, while substantially no peak can be found in Comparative Example 1.

Figure 6A:
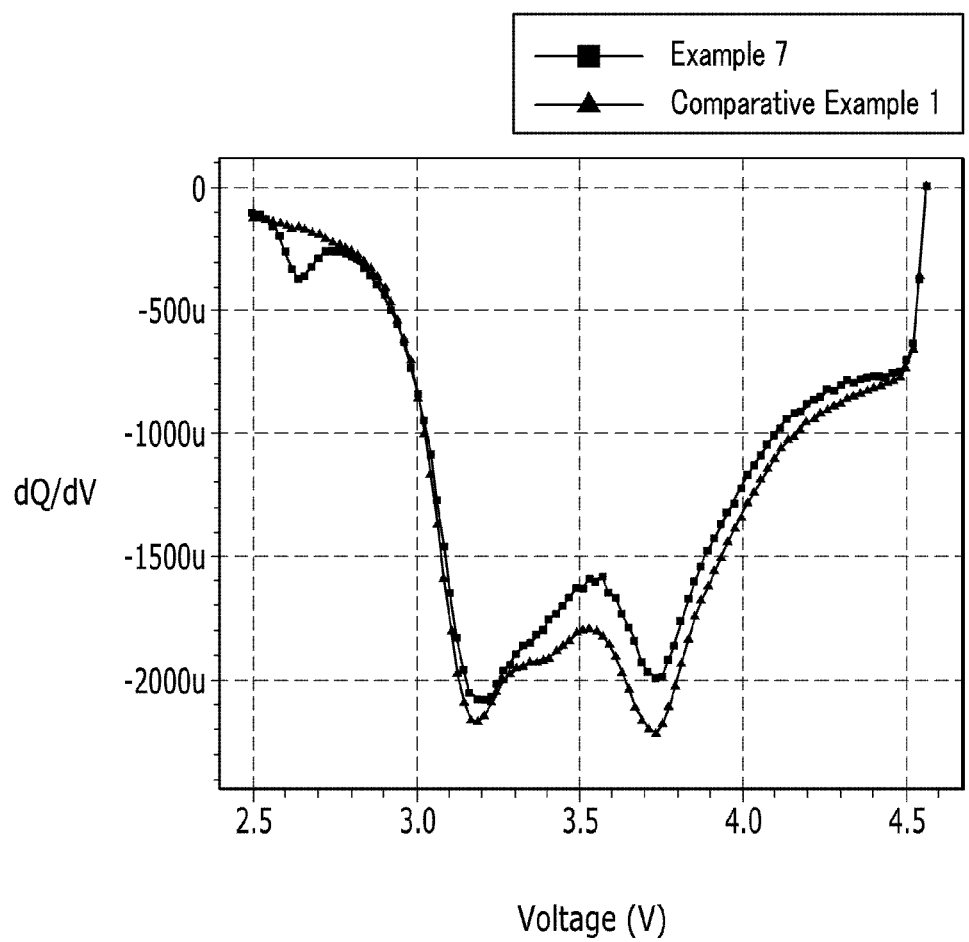
FIG. 6A shows dQ/dV charge and discharge differential curved lines (i.e. a graph of differential capacity dQ/dV vs. voltage) of rechargeable lithium battery cells according to Example 7 and Comparative Example 1, when the cells were charged and discharged 3 times.
Figure 6B:
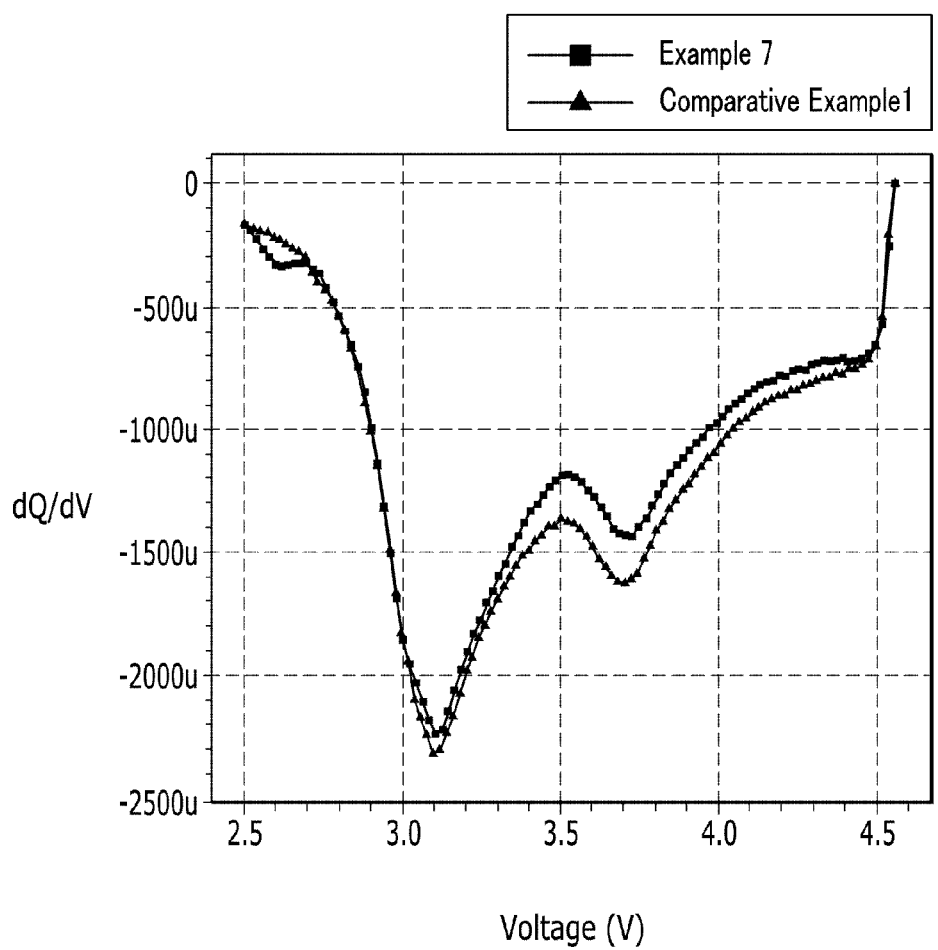
FIG. 6B shows dQ/dV charge and discharge differential curved lines (i.e. a graph of differential capacity dQ/dV vs. voltage) of the rechargeable lithium battery cells according to Example 7 and Comparative Example 1, when the cells were charged and discharged 40 times.

The rechargeable lithium battery cells according to Example 7 and Comparative Example 1 were charged and discharged at 4.7 V to 2.5 V under a 1 C/1 C CC mode at room temperature for 40 cycles, their battery characteristics were evaluated, and the results are provided in FIGS. 6A and 6B.

FIG. 6A is a graph of differential capacity dQ/dV vs. voltage of the rechargeable lithium battery cells according to Example 7 and Comparative Example 1, when each battery was charged and discharged 3 times, and FIG. 6B is a graph of differential capacity dQ/dV vs. voltage of the rechargeable lithium battery cells according to Example 7 and Comparative Example 1, when each battery was charged and discharged 40 times.

Referring to FIGS. 6A and 6B, the rechargeable lithium battery cell according to Example 7 showed a peak between 2.6 V and 2.7 V in the graph of differential capacity dQ/dV vs. voltage, which shows that a compound having a spinel structure was formed as a separate layer between a core including the overlithiated oxide and a second coating layer including the compound represented by Chemical Formula 2. In contrast, the rechargeable lithium battery cell of Comparative Example 1 showed substantially no peak between 2.6 V and 2.7 V, which shows that the coating layer including a compound having a spinel structure was not formed on the surface of the overlithiated oxide.

Evaluation 3: Charge and Discharge Characteristics of Rechargeable Lithium Battery Cell Initial efficiency (%), rate capability and cycle-life characteristics of the rechargeable lithium battery cells according to Examples 1 to 8 and Comparative Example 1 were evaluated, and the results are provided in Table 2 and FIG. 7.

In Table 2, a 3 C/0.33 C capacity ratio (%) was obtained as a percentage of discharge capacity at 3 C relative to discharge capacity at 0.33 C.

In Table 2, a 40 cycles/1 cycle capacity ratio (%) was obtained as a percentage of discharge capacity at the 40$^{th}$ cycle relative to discharge capacity at the first cycle, when the cells were charged and discharged under 1 C/1 C conditions.

TABLE 2

| | Initial efficiency (%) | 3 C/0.33 C capacity ratio (%) | 40 cycle/1 cycle capacity ratio (%) |
|---|---|---|---|
| Example 1 | 92 | 82 | 90 |
| Example 2 | 92 | 81.5 | 88 |
| Example 3 | 92 | 83 | 91 |
| Example 4 | 92 | 82 | 89 |
| Example 5 | 92 | 83 | 92 |
| Example 6 | 92 | 82 | 90 |
| Example 7 | 93 | 83 | 92 |
| Example 8 | 92 | 82 | 91 |
| Comparative Example 1 | 91 | 81 | 86 |

Figure 7:
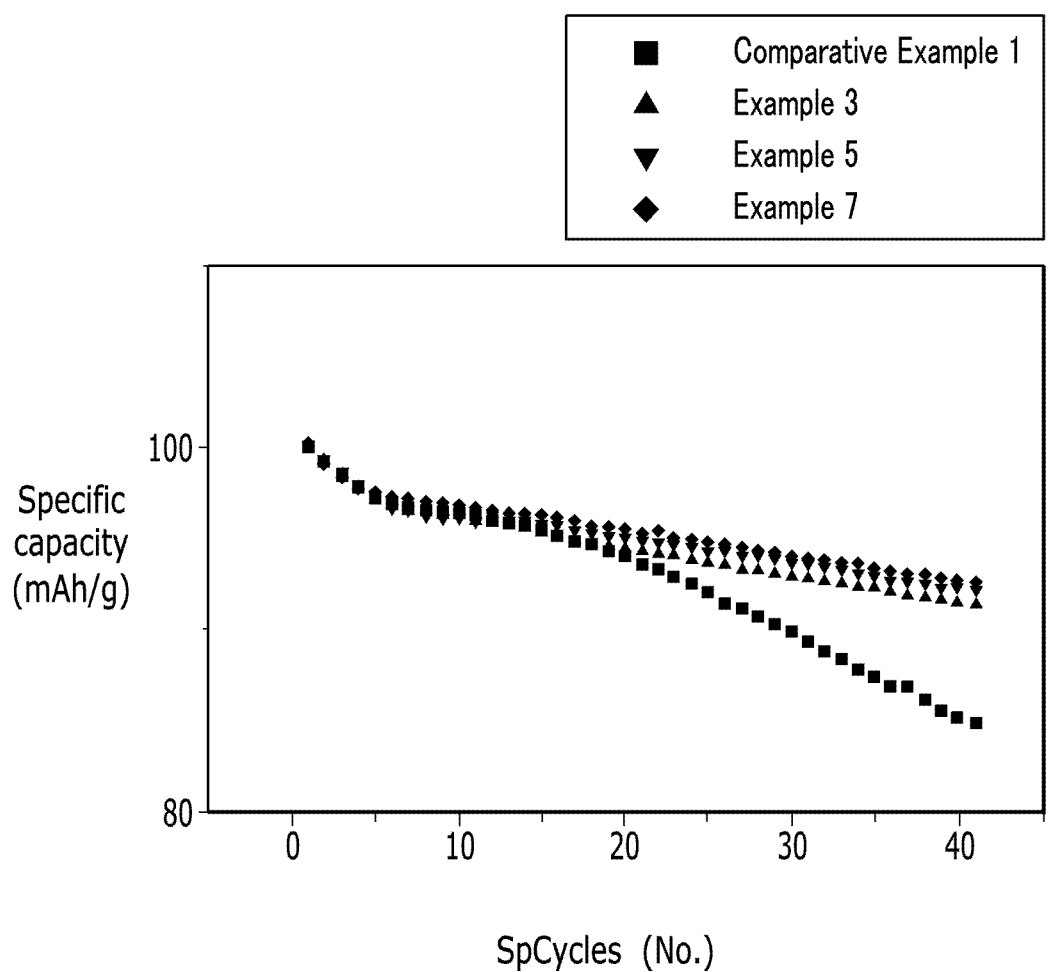
FIG. 7 is a graph showing discharge capacity of the rechargeable lithium battery cells according to Examples 3, 5 and 7 and Comparative Example 1 depending on the number of cycles.

FIG. 7 is a graph showing discharge capacity of the rechargeable lithium battery cells according to Examples 3, 5 and 7 and Comparative Example 1 depending on the number of cycles.

Referring to Table 2 and FIG. 7, the rechargeable lithium battery cells of Examples 1 to 8 in which the compound having a spinel structure and the compound represented by Chemical Formula 2 were coated on the surface of the overlithiated oxide according to one embodiment of the present invention showed good rate capability and cycle-life characteristics compared with the rechargeable lithium battery cell of Comparative Example 1 in which the surface of the overlithiated oxide was not coated.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and equivalents thereof.

What is claimed is:

1. A positive active material for a rechargeable lithium battery comprising:
    a core comprising an overlithiated oxide represented by Chemical Formula 1;
    a first coating layer on the core comprising a compound having a spinel structure; and
    a second coating layer on the first coating layer comprising a compound represented by Chemical Formula 2,
    wherein the compound having a spinel structure has a peak between about 2.6 V and about 2.7 V in a graph of differential capacity dQ/dV versus voltage, the voltage of the graph being between about 4.7 V and about 2.5 V:

$$xLi_2MnO_3 \cdot (1-x)LiNi_aCo_bMn_cO_2, \quad \text{Chemical Formula 1}$$

wherein 0<x<1, 0<a<1, 0<b<1, 0<c<1, and a+b+c=1, $$Li_dTi_eO_2, \quad \text{Chemical Formula 2}$$

wherein 0≤d<1 and 0<e≤1.

2. The positive active material of claim 1, wherein the compound having a spinel structure is a compound represented by Chemical Formula 3:

$$Li_fM_gO_h, \quad \text{Chemical Formula 3}$$

wherein M is Mn, Co, Ni, or a combination thereof, 0<f<1, 1.9<g<2.1, and 3.9<h<4.1.

3. The positive active material of claim 1, wherein the second coating layer comprises about 0.1 parts by mole to about 5 parts by mole of titanium (Ti) based on 100 parts by mole of the core.

4. The positive active material of claim 1, wherein the second coating layer is about 10 nm to about 50 nm thick.

5. The positive active material of claim 1, wherein the first and second coating layers have a total thickness of about 15 nm to about 60 nm.

6. The positive active material of claim 1, wherein the positive active material has an average particle diameter (D50) of about 100 nm to about 500 nm.

7. A rechargeable lithium battery comprising:
    a positive electrode including the positive active material of claim 1;
    a negative electrode; and
    an electrolyte.

8. A method of preparing the positive active material for a rechargeable lithium battery, the method comprising:
    co-precipitating a nickel (Ni) source, a cobalt (Co) source, and a manganese (Mn) source with ammonium hydroxide (NH$_4$OH) or sodium hydroxide (NaOH) to obtain a precipitate;
    mixing the precipitate with a lithium source to obtain a first mixture;
    treating the first mixture with a primary heat treatment to obtain an overlithiated oxide represented by Chemical Formula 1;
    mixing an alcohol and a titanium (Ti) source to obtain a second mixture;
    mixing the second mixture and the overlithiated oxide to obtain a third mixture; and
    treating the third mixture with a secondary heat treatment to obtain the overlithiated oxide coated with a compound having a spinel structure and a compound represented by Chemical Formula 2:

$$xLi_2MnO_3 \cdot (1-x)LiNi_aCo_bMn_cO_2, \quad \text{Chemical Formula 1}$$

wherein 0<x<1, 0<a<1, 0<b<1, 0<c<1, and a+b+c=1, $$Li_dTi_eO_2, \quad \text{Chemical Formula 2}$$

wherein 0≤d<1 and 0<e≤1.

9. The method of claim 8, wherein the titanium (Ti) source comprises titanium isopropoxide, a TiO$_2$ powder, or a combination thereof.

10. The method of claim 9, wherein the titanium (Ti) source is the TiO$_2$ powder having an average particle diameter (D50) of about 10 nm to about 50 nm.

11. The method of claim 8, wherein the titanium (Ti) source is in an amount of about 0.1 parts by mole to about 5 parts by mole based on 100 parts by mole of the overlithiated oxide.

12. The method of claim 8, wherein the primary heat treatment is performed at about 600° C. to about 1000° C.

13. The method of claim 8, wherein the secondary heat treatment is performed at about 300° C. to about 800° C.

* * * * *